June 25, 1963 L. J. LANE 3,095,510

SWITCHING CIRCUIT FOR VOLTAGE MAGNITUDE GREATER THAN THE RATED VOLTAGE OF ONE TRANSISTOR

Filed June 22, 1960

INVENTOR:
LAWRENCE J. LANE,

BY James J. Williams
HIS ATTORNEY.

United States Patent Office 3,095,510

Patented June 25, 1963

3,095,510

SWITCHING CIRCUIT FOR VOLTAGE MAGNITUDE GREATER THAN THE RATED VOLTAGE OF ONE TRANSISTOR

Lawrence J. Lane, Stuarts Draft, Va., assignor to General Electric Company, a corporation of New York Filed June 22, 1960, Ser. No. 38,004
2 Claims. (Cl. 307—88.5)

Figure 1:
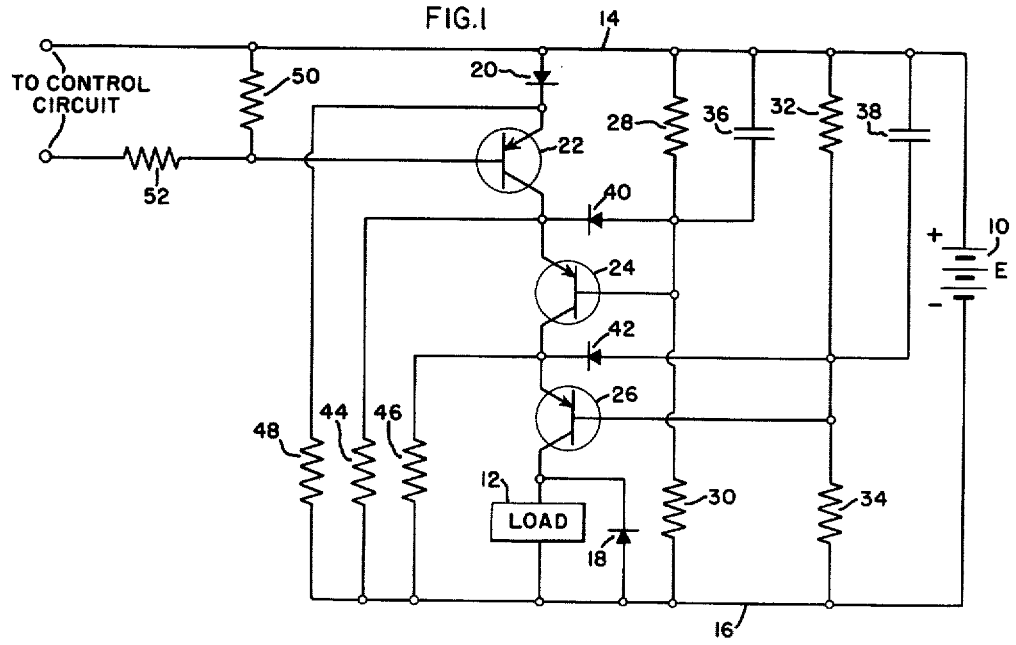

The invention relates to a switching circuit, and particularly to a switching circuit that utilizes transistors for switching a voltage having a magnitude greater than the rated voltage of the individual transistors.

Because of their various advantages, transistors are being used more and more in electronic circuitry. However, the magnitude of voltage which can be applied to presently available transistors is relatively small in comparison to the magnitude of voltage which can be applied to electron vacuum tubes and in comparison to the magnitude of voltage which must be handled in many circuits. This characteristic of transistors which necessitates their being used with only relatively small magnitudes of voltage presents a problem when a transistor is to be used in a circuit to switch a voltage having a magnitude greater than the voltage handling capability of the transistor.

Accordingly, an object of the invention is to provide a novel transistor circuit for switching a voltage having a magnitude greater than the voltage handling capability of the individual transistors in the circuit.

Another object of the invention is to provide a novel switching circuit utilizing a plurality of switching transistors so arranged that an equal portion of the magnitude of voltage to be switched is applied to each of the switching transistors.

Briefly, these and other objects of the invention are accomplished in a switching circuit which switches a source of voltage to and from a load. In accordance with the invention, the switching circuit comprises a master transistor and N slave transistors, where N may be any integer of a value such that the slave transistors do not receive a voltage having a magnitude greater than their voltage handling capability. The master transistor, the slave transistors, and the load are connected in series and are connected across the source of voltage. A voltage divider network is provided and coupled to each emitter of the slave transistors so that a portion of the source voltage is applied to each emitter. Means are coupled to each slave transistor for normally biasing the slave transistor in a cut-off condition. When the master transistor is cut off, the slave transistors are also cut off and each slave transistor receives a portion of the source voltage. When the master transistor conducts, the slave slave transistors also conduct and substantially all of the source voltage is applied to the load.

Figure 2:
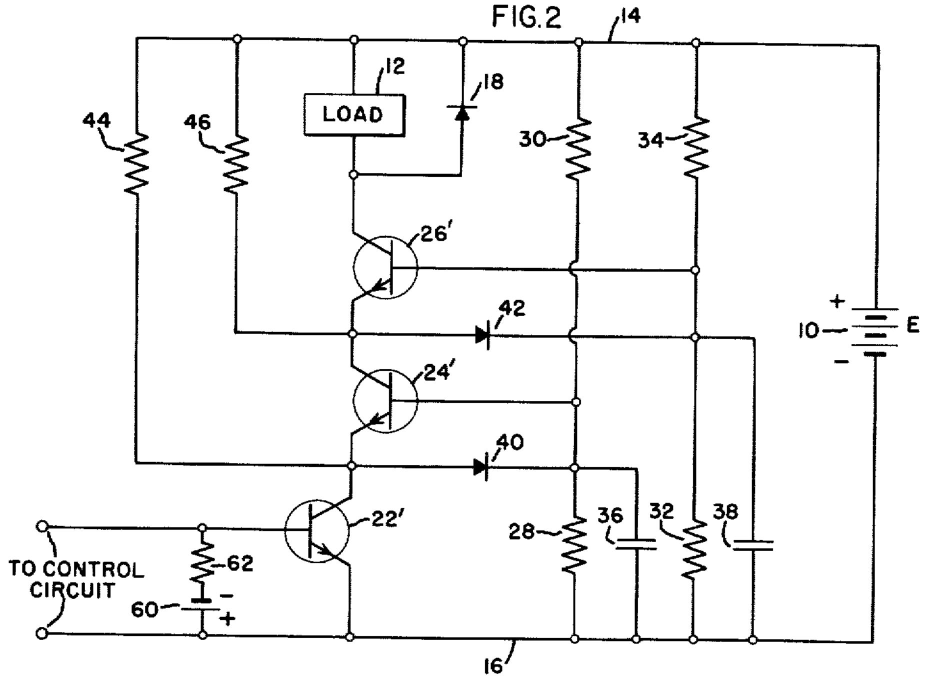

The invention will be better understood from the following description taken in connection with the accompanying drawing, and its scope will be pointed out in the claims. In the drawing:

FIGURE 1 shows an embodiment of the invention utilizing a plurality of PNP transistors; and FIGURE 2 shows another embodiment of the invention utilizing a plurality of NPN transistors.

In FIGURE 1, there is shown a source 10 of unidirectional voltage which, in the figure, is represented by a battery having a magnitude E. The magnitude E of the voltage source 10 may vary from very low values to very high values. The voltage source 10 is to be applied to a load or a load device 12 which is represented as a rectangle or box, since the load 12 may be any type of device. The positive terminal of the voltage source 10 is connected to a positive bus 14, and the negative terminal of the voltage source 10 is connected to a negative bus 16. As will be appreciated by persons skilled in the art, either the positive bus 14 or the negative bus 16 may be connected to a point of reference potential such as ground. If the load 12 is inductive in nature, it may be shunted by a free-wheeling diode or rectifier 18 to dissipate the energy stored in the load 12 when the voltage source 10 is switched off. Connected between the positive bus 14 and the negative bus 16 is a series circuit including a biasing diode 20, a master transistor 22 of the PNP variety, N slave transistors 24, 26 also of the PNP variety, and the load 12. The biasing diode 20, the master transistor 22, and the slave transistors 24, 26 are poled to permit current to flow from the positive bus 14 to the negative bus 16 when the circuit is switched on. A voltage divider network is provided for each of the slave transistors 24, 26 for the purpose of placing the potential of the emitter and base of each of the slave transistors 24, 26 at predetermined levels. In other words, equal portions of the magnitude E of the voltage source 10 appear across each of the transistors 22, 24, 26. Thus, where there are two slave transistors 24, 26, the emitter-collector potential of the master transistor 22 is one-third E, the emitter-collector potential of the first slave transistor 24 is one-third E, and the emitter-collector potential of the second slave transistor 26 is one-third E. The first voltage divider network for the first slave transistor 24 may comprise a pair of resistors 28, 30, connected in series between the positive bus 14 and the negative bus 16. The junction of the resistors 28, 30 is connected through a biasing diode 40 to the emitter of the first slave transistor 24, and directly to the base of the same transistor. To provide the appropriate voltage for the emitter and base of the first slave transistor 24, the magnitude of the resistor 28 would be approximately one half of the magnitude of the resistor 30. Similarly, the second voltage divider network may comprise a pair of resistors 32, 34 connected in series between the positive bus 14 and the negative bus 16. The junction of the resistors 32, 34 is connected through a biasing diode 42 to the emitter of the second slave transistor 26, and directly to the base of the same transistor. To provide the appropriate voltage for the emitter and base of the second slave transistor 26, the magnitude of the resistor 32 would be approximately twice the magnitude of the resistor 34. The upper resistors 28, 32 of the two voltage divider networks may be respectively shunted by capacitors 36, 38 for the purpose of preventing overshoot in the negative-going change in voltage at the respective basis of the slave transistors 24, 26 at the time they are cut off. This type of overshoot can be caused by any inductance which may be present in the resistors 30, 34 and might cause gradual deterioration of the slave transistors 24, 26.

Where there are N slave transistors, the potential of the emitter and base of the *n*th slave transistor with respect to the positive bus 14 is substantially equal to $$\frac{E\times n}{N+1}$$

In this relation, $n$ is the number of the slave transistor counter from the master transistor, N is the total number of slave transistors, and E is the magnitude of the voltage source 10. Thus, it will be seen that for any number of slave transistors, the voltage dividing networks insure that substantially the same potential appears across each of the transistors. Persons skilled in the art will appreciate that the number of slave transistors which must be used depends upon the magnitude of the voltage E of the voltage source 10 and upon the voltage handling capability or rating of the slave transistors used.

In order that the slave transistors may be normally biased in a cut-off condition, the biasing diodes or rectifiers 40, 42 are coupled between each base and emitter of each of the slave transistors 24, 26. The biasing diodes 40, 42 are poled so that normal current flow through the biasing diodes 40, 42 tends to bias the slave transistors 24, 26 in a cut-off direction. Thus, where the slave transistors 24, 26 are of the PNP variety shown in FIGURE 1, the emitters are more negative than their respective bases because of the voltage drop across the respective biasing diodes 40, 42. The biasing diodes 40, 42 are provided with a direct current path through respective biasing resistors 44, 46 which are respectively coupled between the emitters of each of the slave transistors 24, 26 and the negative bus 16. When the slave transistors 24, 26 are nonconducting, the biasing diodes 40, 42 insure that no leakage current flows which might cause the slave transistors 24, 26 to begin conducting. The master transistor 22 is normally held in a nonconducting condition by a circuit including a resistor 50 coupled between its base and the positive bus 14, the biasing diode 20, and a direct current path from the emitter of the master transistor 22 through a biasing resistor 48 to the negative bus 16. The base of the master transistor 22 is also coupled to the control circuit through a coupling resistor 52. The other side of the control circuit may be coupled to the positive bus 14 as shown.

In the absence of a control signal from the control circuit the master transistor 22 is held off or nonconducting because its emitter is negative with respect to its base as a result of the voltage drop across the biasing diode 20. Consequently, substantially no collector current flows through the master transistor 22. The biasing diodes 40, 42 provide a voltage drop between the base and emitter of the slave transistors 24, 26 to hold these transistors 24, 26 cut off or nonconducting. As already explained, the N slave transistors have their bases and emitters (except for the bias voltage) at substantially equally divided voltage points as a result of the voltage dividing networks. From the expression given above the potential between the emitter and base of the first slave transistor 24 and the positive bus 14 is substantially $$\frac{E}{3}$$

the potential between the emitter and base of the second slave transistor 26 and the positive bus 14 is substantially $$\frac{2E}{3}$$

and the potential between the negative bus 16 and the positive bus 14 is E. Thus, each of the transistors is subjected to only one third of the magnitude E of the voltage source 10. When the control circuit is operated, it applies a signal through the switching resistor 52 such that the base of the master transistor 22 may become negative so that the master transistor 22 conducts. It will be seen that if the master transistor 22 is rendered conducting, the slave transistors 24, 26 will also be rendered conducting and will apply the voltage source 10 to the load 12. The only voltage drop would be in the diode 20 and in the various transistors 22, 24, 26. Also, when the master transistor 22 is rendered nonconducting, the slave transistors 24, 26 are also rendered nonconducting. Thus, the invention shown in FIGURE 1 provides a transistor switching circuit which is able to handle a voltage source 10 that has a magnitude E which is greater than the voltage handling capability of any one of the individual transistors used. The switching operation can take place in a very short length of time. For example, with two slave transistors, switching takes place in approximately four microseconds.

FIGURE 2 shows another embodiment of the invention utilizing NPN transistors instead of the PNP transistors shown in FIGURE 1. In FIGURE 2, the same or equivalent circuit elements are given the same reference numerals as they received in FIGURE 1, and the substitutional circuit elements are given the same reference numeral followed by a prime. Thus, in FIGURE 2, a series circuit is coupled from the negative bus 16 to the positive bus 14 and includes a master transistor 22′, a first slave transistor 24′, a second slave transistor 26′, and the load 12. The transistors are appropriately connected as NPN transistors, and the first and second slave transistors 24′, 26′ are biased by the rectifying elements or diodes 40, 42. Likewise, the first and second slave transistors 24′, 26′, have their respective voltage dividing networks so proportioned in accordance with the previously discussed relation that the various transistors each share an equal portion of the magnitude E of the voltage source 10. Substantially the only other difference between FIGURES 2 and 1 is the biasing arrangement provided for the master transistor 22′. It is to be understood, however, that this biasing arrangement or its equivalent may also be used in the arrangement of FIGURE 1 for the master transistor 22. In FIGURE 2, this biasing arrangement includes a biasing battery 60 and a biasing resistor 62 coupled in series between the emitter and base of the master transistor 22′ so that the base of the master transistor 22′ is normally negative with respect to its emitter. In the absence of a signal provided by the switching circuit, the master transistor 22′ is held off or nonconducting, and similarly (as explained in connection with FIGURE 1) the slave transistors 24′, 26′ are also held cut off or nonconducting. When the master transistor 22′ is rendered conducting by the application of a switching signal which makes the base positive with respect to the emitter, the slave transistors 24′, 26′ are rendered conducting so that the voltage source 10 is applied to the load 12 in the same manner described in connection with FIGURE 1.

Persons skilled in the art will readily appreciate that various modifications of the arrangement shown in FIGURES 1 and 2 can be made. Thus, the biasing arrangement for the master transistor 22′ in FIGURE 2 can be used in place of the biasing arrangement of the master transistor 22 in FIGURE 1, and likewise the biasing arrangement for the master transistor 22 of FIGURE 1 can be used in place of the biasing arrangement for the master transistor 22′ of FIGURE 2. An advantage of the invention is that the number of slave transistors can be chosen to meet any circuit conditions, depending upon the magnitude E of the voltage source and also depending upon the voltage handling capabilities of the slave transistors. Another advantage of the invention is that although the magnitude E of the voltage source may vary from a very low magnitude (approximately one-half volt per transistor) to an upper limit imposed by the ratings of the transistors, the circuit of the invention maintains the proper cut-off bias on each transistor and also provides sufficient (but not wasteful) cut-on current for each emitter-base circuit. While the invention has been described with reference to particular embodiments, it is to be understood that modifications may be made by persons skilled in the art without departing from the spirit of the invention or from the scope of the claims.

What I claim as new and desire to secure by Letters Patent of the United States is:

1. A switching circuit for applying a voltage source of magnitude E to a load in response to a control signal comprising a master transistor having an emitter, a base, and a collector, means coupled to said master transistor for normally biasing said master transistor in a cut-off condition, means coupled to said master transistor to render said master transistor conductive in response to said control signal, N slave transistors each having an emitter, a base, and a collector, where N is any integer, means coupling said master transistor, said slave transistors, and said load in a series circuit in that order between first and second points, means coupling said first and second points of said series circuit across said source of voltage, N voltage divider circuits coupled between said first and second points, and first means coupling said emitter of each of said slave transistors to a respective one of said voltage divider circuits at a point thereon that has a potential with respect to said first point which is substantially equal to $$\frac{E \times n}{N+1}$$

where $n$ is the number of the slave transistor counted from said master transistor, said first means including a rectifier device coupled between said emitter and base of each of said slave transistors and including a direct current path for said rectifier device to one of said first and second points of said series circuit.

2. A switching circuit for applying a voltage source of magnitude E to a load in response to a control signal comprising a master transistor having an emitter, a base, and a collector, means coupled to said master transistor for normally biasing said master transistor in a cut-off condition, means coupled to said master transistor to render said master transistor conductive in response to said control signal, N slave transistors each having an emitter, a base, and a collector, where N is any integer, means coupling said master transistor, said slave transistors, and said load in a series circuit in that order between first and second points to conduct current between said points, means coupling said first and second points of said series circuit across said source of voltage, N voltage divider circuits coupled between said first and second points, means coupling said base of each of said slave transistors to a respective one of said voltage divider circuits at a point thereon that has a potential with respect to said first point which is substantially equal to $$\frac{E \times n}{N+1}$$

where $n$ is the number of the slave transistor counted from said master transistor, and respective means for biasing said slave transistors toward cutoff including a rectifier device coupled between said emitter and base of each of said slave transistors and including an impedance capable of carrying direct current coupled between said emitter of each of said slave transistors and said first and second point.

References Cited in the file of this patent

UNITED STATES PATENTS

| | | |
|---|---|---|
| 2,892,100 | Huang et al. | June 23, 1959 |
| 2,943,267 | Randise | June 28, 1960 |
| 2,967,951 | Brown | Jan. 10, 1961 |

UNITED STATES PATENT OFFICE

CERTIFICATE OF CORRECTION

Patent No. 3,095,510 June 25, 1963

Lawrence J. Lane

It is hereby certified that error appears in the above numbered patent requiring correction and that the said Letters Patent should read as corrected below.

Column 2, line 49, for "basis" read -- bases --; line 61, for "counter" read -- counted --; column 3, line 27, and column 4, line 26, after "held", each occurrence, insert -- cut --; column 6, line 18, strike out "first and".

Signed and sealed this 31st day of March 1964.

(SEAL)
Attest:
ERNEST W. SWIDER

Attesting Officer

EDWARD J. BRENNER

Commissioner of Patents